D. A. MANUEL.
Gang-Plow.

No. 166,536. Patented Aug. 10, 1875.

WITNESSES:
Chas. Hida
A. F. Terry

INVENTOR:
D. A. Manuel
BY
[signature]
ATTORNEYS.

UNITED STATES PATENT OFFICE.

DAVID A. MANUEL, OF NAPA, CALIFORNIA.

IMPROVEMENT IN GANG-PLOWS.

Speicfication forming part of Letters Patent No. 166,536, dated August 10, 1875; application filed May 8, 1875.

*To all whom it may concern:*

Figure 1:
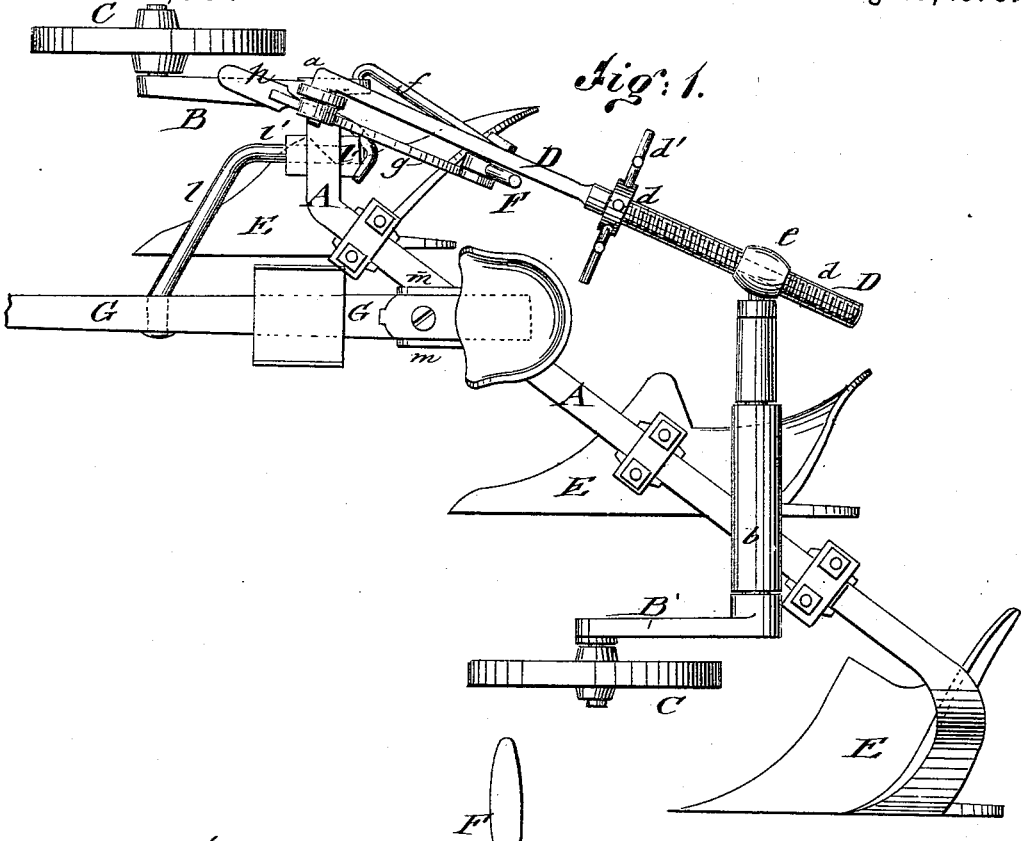
Figure 2:
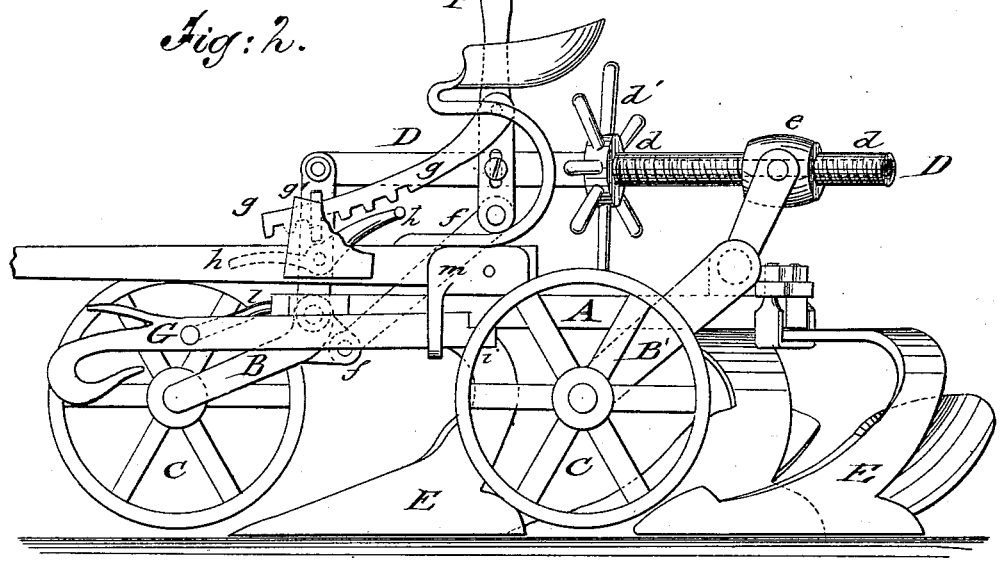

Be it known that I, DAVID A. MANUEL, of Napa, in the county of Napa and State of California, have invented a new and Improved Gang-Plow, of which the following is a specification:

In the accompanying drawing, Figure 1 represents a top view, and Fig. 2 a side elevation of my improved gang-plow.

Similar letters of reference indicate corresponding parts.

The invention will first be described in connection with drawing, and then pointed out in claims.

In the drawing, A represents the main beam of my improved gang-plow, which is arranged at an inclination or oblique angle to the direction of draft. The front end of main beam A is curved sidewise, and the crank-axle B of the front supporting-wheel C, hinged by an eye or sleeve, $a$, thereto. The crank-axle B' of the rear supporting-wheel C swings in a sleeve or thimble, $b$, of the main beam, the pivoted arm of the same being at such an angle to the wheel-carrying arm that it extends in lateral direction across the main beam to the connecting rear shaft D. Both supporting-wheels C are applied by their crank-axles in such a manner to the main beam that they run parallel to the line of draft. Two plows, E, are firmly attached by clips to the main beam A between the supporting-wheels, and are adjustable thereon to different widths. A third plow, E, is attached in similar manner by clips to the rear end of the main beam, and carried by its curved plow-stock to the outside of the rear wheel, so as to run close to the main stalk or vine without disturbing any of the young fruit-spurs. The outer plow is provided with a cutter-point extending vertically upward for parting the earth near the main stalk in such a manner as not to tear the ground loose or away from said stalk, allowing it to set firm in its place without being torn up by the roots, as is commonly the case with young or tender vines. The plows are set obliquely to the main beam and parallel to the direction of draft, their points being in line with the supporting-wheels, so as to compel the plows to cut an even and equal depth over rough or uneven ground and up or down hill. The crank-axle governing rear shaft D is pivoted at its front end to an upright arm of front axle B. The rear end is provided with a screw-threaded sleeve, $d$, that is readily turned on the shaft end by a hand-wheel, $d'$, from the driver's seat. A thimble or nut, $e$, is swiveled to an upward bent extension of rear crank-arm B, and travels in forward or backward direction on screw-sleeve $d$, producing thereby the raising or lowering of the rear wheel by the swinging of the crank-axle in the socket-sleeve of the main beam, and the setting of the plows to any required depth. A hand-lever, F, is fulcrumed to the front part of the rear shaft D to be conveniently operated from the driver's seat. The lower end of lever F connects by lever-rod $f$ with the crank-axle B near its pivot-eye, on the main beam, while an arc-shaped rack, $g$, is pivoted above the fulcrum of lever F, and guided in a staple, $g'$, of the upright arm of crank-axle B. The locking of rack-arm $g$ to the staple secures the rigid position of the axle governing rear shaft and of the plows. A foot-lever, $h$, is pivoted below the staple $g'$, and thrown up by the pressure of the foot of the driver for releasing the rack $g$ from the staple. The hand-lever is at the same time taken hold of by the hand, and carried forward or back, as required, which moves the rear shaft, and lowers or raises thereby the crank-axle and wheels, so as to regulate the working of the plows. The draft-beam G is attached to the center of the main beam A by a strong bolt, $i$, and secured still more by a side brace, $l$, and adjusting-nuts $l'$ to the front end of main draft A. The direction of the draft-beam may, by the adjusting nuts and brace, be changed slightly from the line of draft, and thereby the plows thrown to or from the land, as desired. The pole is secured by a lateral pivot-bolt into a tongue-socket, $m$, of the draft-beam, and set at the front end to such height that the weight is taken off from the horses' necks. The under side of the pole is rounded off to allow the same to swing in the tongue-socket, which, by its guides or side flanges, compels the pole to follow the line of draft-beam. The driver's seat is attached to the rear end of pole within easy distance of adjusting hand-wheel, hand-lever, and rack-treadle, so that the plow may be readily operated when in motion.

Having thus described my invention, I claim as new and desire to secure by Letters Patent—

1. The combination of the main beam A and crank-axle B swinging thereon with the governing rear shaft D, fulcrumed hand-lever F, and rack and treadle mechanism for raising and lowering wheels and regulating depth of plows, substantially as set forth.

2. The combination of the rear crank-axle and shaft B', having swiveled nut e, with the revolving screw-sleeve d, of rear shaft D, for setting plows to exact depth required, as specified.

3. The main beam A, in combination with pivoted draft-beam G, having socket m with tongue pivoted therein, and adjustable side brace l to throw draft-beam out of line of draft and plows to or from the land, as set forth.

DAVID A. MANUEL.

Witnesses:
C. B. SEELEY,
E. D. SAWYER.